United States Patent [19]

Cabasso et al.

[11] Patent Number: 5,488,087

[45] Date of Patent: Jan. 30, 1996

[54] PREPARATION OF POLYDIORGANOSILOXANE AND SULFONATED POLYOLEFIN BLENDS

[75] Inventors: Israel Cabasso, Syracuse, N.Y.; Daniel Graiver, Midland, Mich.

[73] Assignees: Dow Corning Corporation, Midland, Mich.; University of New York, Albany, N.Y.

[21] Appl. No.: 261,080

[22] Filed: Jun. 16, 1994

[51] Int. Cl.[6] .................................................. C08L 83/04
[52] U.S. Cl. ................................. 525/100; 528/23
[58] Field of Search ............................. 525/100; 528/23

[56] References Cited

U.S. PATENT DOCUMENTS

| | | | |
|---|---|---|---|
| 3,694,405 | 9/1972 | Litteral | 528/23 |
| 4,310,679 | 1/1982 | Finke et al. | 556/462 |

FOREIGN PATENT DOCUMENTS

| | | |
|---|---|---|
| 57-200456 | 12/1982 | Japan . |
| 1-146906 | 6/1989 | Japan . |
| 1-279942 | 11/1989 | Japan . |
| 2-202532 | 8/1990 | Japan . |
| 2-242839 | 9/1990 | Japan . |
| 3-139545 | 6/1991 | Japan . |

OTHER PUBLICATIONS

J. Am. Chem. Soc. 77:2998, Oct. 1955.

Koshima et al., Nippon Kagaku Zasshi, 77:1755–1759, Dec. 1956.

*Primary Examiner*—Ralph H. Dean
*Attorney, Agent, or Firm*—William F. Boley

[57] ABSTRACT

A method for forming blends of polydiorganosiloxanes and solid, sulfonated polyolefins and novel blends prepared by the method. In the present method the solid, sulfonated polyolefin is swollen with a diorganosiloxane oligomer whose rearrangement to high molecular weight polydiorganosiloxanes is catalyzed in situ by the sulfonic acid substituents of the polyolefin.

16 Claims, No Drawings

PREPARATION OF POLYDIORGANOSILOXANE AND SULFONATED POLYOLEFIN BLENDS

BACKGROUND OF INVENTION

The present invention is a method for forming blends of polydiorganosiloxanes and solid, sulfonated polyolefins and novel blends prepared by the method. In the present method a solid, sulfonated polyolefin is swollen with a diorganosiloxane oligomer whose rearrangement to high molecular weight polydiorganosiloxanes is catalyzed in situ by the sulfonic acid substituents of the polyolefin.

Incorporation of a polymer inside another polymer matrix is a useful technique for preparing a material with a different set of properties than either of the individual polymeric components. Such a multicomponent system can be prepared by swelling a polymeric matrix with a monomer which is then polymerized and crosslinked in situ. The poor miscibility of diorganosiloxanes with most organic polymers has impeded their use in such multicomponent systems.

The present inventors have found that the sulfonic acid substituents of solid, sulfonated polyolefins can serve as an in situ polymerization catalyst for diorganosiloxane oligomers diffused into the matrix of the solid, sulfonated polyolefin. Depending upon the concentration of polydiorganosiloxane present in the multicomponent system, the polydiorganosiloxane can be present as an interpentrating network, a pseudo-interpentrating network, or as isolated domains within the matrix formed by the sulfonated polyolefin. Blends prepared by the present method can have improved and unique properties when compared to the solid, sulfonated polyolefin.

The acid-catalyzed rearrangement of siloxane linkages in organopolysiloxanes is a well known reaction. For example, Hurd, J. Am. Chem. Soc. 77:2998, 1955, describes the use of sulfuric acid to catalyze the rearrangement of octamethyltetracyclosiloxane to high molecular weight linear polydimethylsiloxanes. A similar process is described by Koshima et al., Nippon Kagaku Zasshi, 77:1755–1759, 1956.

Finke et al., U.S. Pat. No. 4,310,679, issued Jan. 12, 1982, describe a process where an organosiloxane mixture is equilibrated by contact with a cation exchange resins which has side chains carrying sulphonyl groups, the carbon atoms carrying the sulphonyl groups also carrying at least one fluorine atom.

In addition, it is known in the art to improve the properties of materials such as chlorosulfonated polyethylene by the incorporation in the composition of other polymeric materials. For example, Watanabe, Japanese Kokai Patent Application No. Hei 3(1991)-139545, describes a process where a chlorosulfonated polyethylene is blended with a an alicyclic epoxy compound. The cured composition is reported to have improved fatigue resistance, when compared to the chlorosulfonated polyethylene.

Densen et al., Japanese Kokai Patent Application No. Hei 2(1990)-242839 describe a process where a liquid chlorosulfonated polyethylene is blended with a liquid siloxane mixture containing silicon-bonded hydrogens and vinyls that can undergo a hydrosilation reaction in the presence of a platinum compound. Crosslinking of the liquid siloxane or both the liquid siloxane and the chlorosulfonated polyethylene is effected to form a macromolecular network structure.

The described art does not recognize that a solid, sulfonated polyolefin can act as a catalyst for the in situ polymerization of polydiorganosiloxane oligomers to form high molecular weight polydiorganosiloxanes within the matrix of the solid, sulfonated polyolefin. In the present method the problem associated with the miscibility of polyorganosiloxane polymers with olefins is largely overcome. In addition, no fugitive catalyst is present in the composition that must be removed by additional processing. The in situ polymerization of the diorganosiloxane oligomers in the matrices of the solid, sulfonated polyolefin can provide for improved physical properties of the sulfonated polyolefin.

SUMMARY OF INVENTION

The present invention is a method for forming blends of polydiorganosiloxanes and solid, sulfonated polyolefins and novel blends prepared by the method. In the present method the solid, sulfonated polyolefin is swollen with a diorganosiloxane oligomer whose rearrangement to high molecular weight polydiorganosiloxanes is catalyzed in situ by the sulfonic acid substituents of the polyolefin.

DESCRIPTION OF INVENTION

The present invention is a method for preparing a blend comprising a polydiorganosiloxane and a solid, sulfonated polyolefin. The method comprises:

(A) swelling a solid, sulfonated polyolefin with a liquid comprising a diorganosiloxane oligomer and (B) maintaining the solid, sulfonated polyolefin at a temperature sufficient for sulfonic acid substituents of the solid, sulfonated polyolefin to catalyze the polymerization of the diorganosiloxane oligomers within the solid, sulfonated polyolefin;

where the diorganosiloxane oligomer contains from three to about 40 units of formula $R_2SiO$, each R is independently selected from a group consisting of alkyl radicals comprising one to 12 carbon atoms, alkenyl radicals comprising two to about 12 carbon atoms, aryls, and fluorine substituted alkyl radicals comprising one to about 12 carbon atoms.

Blends prepared by the present process comprise a solid, sulfonated polyolefin. By "solid" it is meant that the sulfonated polyolefin is crosslinked sufficiently to maintain its physical integrity during conduct of the present method. The solid, sulfonated polyolefin can be, for example, a sheet, thread, hollow-fiber, extrusion, or molded shape.

The solid sulfonated polyolefin can be formed, for example, by chlorosulfonation of a solid polyolefin obtained by polymerization of an olefin or a mixture of olefins selected from a group consisting of ethylene, propylene, butene-1,4-methylpentene-1, isobutylene, and styrene. The sulfonyl chloride groups can then be hydrolyzed, for example, in an aqueous base such as potassium hydroxide or in a water dimethylsulfoxide (DMF) mixture to form sulfonic acid groups. Preferred is when the solid, sulfonated polyolefin is sulfonated polyethylene.

The sulfonic acid groups substituted on the solid polyolefin function as a catalyst to effect in situ polymerization of the diorganosiloxane oligomer within the matrix of the solid, sulfonated polyolefin. Therefore, any amount of sulfonation of the solid polyolefin which facilitates the polymerization of the diorganosiloxane oligomer is useful in the present method. However, preferred is when the solid, sulfonated polyolefin contains about 0.1 to 5 meq of sulfonic acid per gram of solid polyolefin.

The solid, sulfonated polyolefin is swollen with a liquid mixture comprising a diorganosiloxane oligomer. Swelling of the solid, sulfonated polyolefin with the diorganosiloxane oligomer can be effected by standard methods, for example, immersion of the solid, sulfonated polyolefin in a liquid mixture comprising the diorganosiloxane oligomer in excess. Diorganosiloxane oligomers useful in the present method comprise from three to about 40 units of the formula R$_2$SiO, where each R is independently selected from a group consisting of alkyl radicals comprising one to 12 carbon atoms, alkenyl radicals comprising two to about 12 carbon atoms, aryls, and fluorine substituted alkyl radicals comprising one to about 12 carbon atoms. The radical R can be, for example, methyl, ethyl, n-propyl, isopropyl, n-butyl, sec-butyl, dodecyl, vinyl, allyl, phenyl, naphthyl, tolyl, and 3,3,3-trifluoropropyl. Preferred is when each radical R is methyl.

The diorganosiloxane oligomers can be cyclic diorganosiloxanes oligomers or linear hydroxy end-terminated diorganosiloxanes oligomers. Preferred is when the diorganosiloxane oligomer is a cyclic diorganosiloxane comprising three to about seven of the R$_2$SiO units. Even more preferred is when the diorganosiloxane oligomer is a cyclic diorganosiloxane oligomer comprising four to six of the R$_2$SiO units and each R is methyl. A preferred cyclic diorganosiloxane oligomer is octamethylcyclotetrasiloxane.

The liquid mixture used for swelling the solid, sulfonated polyolefin may comprise a solvent effective to increase the rate of swelling of the solid, sulfonated polyolefin and facilitate permeation of the diorganosiloxane oligomer into the solid, sulfonated polyolefin matrix. A preferred solvent is a hydrocarbon or a chlorine substituted hydrocarbon having a boiling point within a range of about 20° C. to 150° C. The solvent can be, for example, toluene, xylene, hexane, nonane, carbon tetrachloride, chloroform, methylene chloride, dichloroethane trichoroethylene, perchloroethylene, and tetrachloroethane. Preferred are those hydrocarbon solvents and substituted hydrocarbon solvents having a boiling point within a range of about 20° C. to 100° C. The volume ratio of solvent to diorganosiloxane oligomer in the liquid mixture can be varied within a broad range. Generally a volume ratio of solvent to diorganosiloxane oligomer within a range of about 5:1 to 0.01:1 may be used in the present method. Preferred is when the volume ratio of solvent to diorganosiloxane oligomer is within a range of about 1:1 to 0.05:1.

The solid, sulfonated polyolefin is maintained at a temperature sufficient for the sulfonic acid substituents to catalyze the polymerization of the diorganosiloxane oligomers within the matrix of the solid, sulfonated polyolefin. The temperature can be within a range from about 20° C. up to, but not including the melting temperature of the sulfonated polyolefin. The inventors believe that both the polymerization rate of the diorganosiloxane oligomers and the rate of diffusion of the oligomers is temperature dependent. Therefore, it is desirable to selected a temperature based upon such factors as, the molecular weight of diorganosiloxane oligomer used and its rate of diffusion in the solid, sulfonated polyolefin; effect of solvent, if used, on diffusion; and thickness of the solid, sulfonated polyolefin. These factors should be balanced against the polymerization rate of the diorganosiloxane oligomers in selecting an appropriate temperature to insure that the desired permeation of the diorganosiloxane oligomer into the solid, sulfonated polyolefin is not overly inhibited by the polymerization process.

For example, when the solid, sulfonated polyolefin is a sulfonated polyethylene sheet having about 0.1 to 5 meq of sulfonic acid per gram and about 0.1 to 3 mm in thickness, a temperature within a range of about 20° C. to 100° C. has been found useful.

The length of time required for the diorganosiloxane oligomer to polymerize will depend upon such factors as discussed for diffusion, and more particularly upon the temperature at which the method is conducted and the presence of a solvent. Generally, increasing the temperature increases the polymerization rate and use of a solvent allows polymerization to proceed more rapidly. The length of time required for polymerization of the diorganosiloxane oligomers to reach equilibrium can be from several hours to several months depending upon the discussed factors. Also of consideration is the amount of polydiorganosiloxane desired to be present in the solid, sulfonated polyolefin. Generally, higher temperatures and the use of solvents increase the amount of polydiorganosiloxane contained in the solid, sulfonated polyolefin.

The length of time required for the diorganosiloxane oligomer to polymerize can depend upon the availability of water in the method. Water can be added to the method as a liquid or as a vapor. Generally, the amount of water can be varied within broad limits. However, it is preferred that the water be available in the method in about stoichiometric amounts.

The present invention is a method for preparing novel blends of polydiorganosiloxanes and solid, sulfonated polyolefins. Blends prepared by the present method can comprise about 100 parts by weight of a solid, sulfonated polyolefin and 0.1 to 900 parts by weight of a hydroxy end-terminated polydiorganosiloxane containing units described by formula R$_2$SiO where R is as previously described. Those skilled in the art will recognize that crosslinking between the hydroxy end-terminated polydiorganosiloxane chains may occur, in which case RSiO$_{3/2}$ units may also be present. The blends can also contain from zero to about five weight percent chlorine. Preferred are those blends where the hydroxy end-terminated polydiorganosiloxane comprises about 0.1 to 100 parts by weight per 100 parts by weight of the solid, sulfonated polyolefin. Even more preferred are those blends where the hydroxy end-terminated polydiorganosiloxane comprises about 0.1 to 2.0 parts by weight per 100 parts by weight of the solid sulfonated polyolefin. The inventors believe that within this more preferred weight range for the hydroxy end-terminated polydiorganosiloxane an interpenetrating or pseudo-interpenetrating network is formed in the blend. Above about 2.0 parts by weight polydiorganosiloxane per 100 weight parts of solid, sulfonated polyolefin the hydroxy end-terminated polydiorganosiloxane may begin to separate into separate domains within the solid, sulfonated polyolefin.

The hydroxy end-terminated polydiorganosiloxane dispersed in the solid, sulfonate polyolefin can have a weight average molecular weight within a range of about $1 \times 10^4$ to about $2 \times 10^6$.

The following examples are provide to illustrate the present invention. These examples are not intended to limit the scope of the claims herein.

EXAMPLE 1

The ability of sulfonated polyethylene (SPE) sheets to catalyze the in situ polymerization of octamethylcyclotetrasiloxane (D$_4$) was evaluated.

Polyethylene flat-sheeting having a thickness of about 0.5 mm was acquired from Petrochemical Industries, Haifa, Israel (Polyethylene-100, d=0.921 g/cm$^3$). The sheeting was chlorosulfonated by immersing for six hours at room temperature in a sulfur dioxide/chlorine gas mixture (3:1 volume ratio) in visible light. The chlorosulfonated polyethylene sheeting was then immersed in 1N NaOH at 50° C. for two days to hydrolyze the pendant sulfonyl chloride groups (—SO$_2$Cl) groups to sulfonic groups (—SO$_3$Na+). The sulfonic acid form was obtained by treating the sheeting with 1N HCl at room temperature for four hours. The SPE sheeting was then washed with deionized water and dried under vacuum. The milli-equivalence (meq) of sulfonic acid groups per gram of polyethylene was determined by titration with NaOH and found to be 1.69 meq/g.

The in-situ polymerization of liquid D$_4$ was achieved by immersing the SPE sheeting in excess D$_4$. The length of time of immersion of the SPE sheeting in D$_4$, as well as the temperature of the liquid $D_4$, is reported in Table 1. At the end of the treatment period the SPE sheeting was removed from the $D_4$ and washed with chloroform to remove surface $D_4$ and surface associated polydimethylsiloxane. The washed samples were then dried in a vacuum oven at 45° C. for at least 48 hours or until the SPE sheeting displayed a constant weight. The concentration of polydimethylsiloxane remaining in the SPE was determined by comparing the weight of the SPE sheeting before and after treatment. The results are reported in Table 1.

TABLE 1

In Situ Polymerization of $D_4$ in SPE

| Sample No. | Temp. °C. | Time(days) | Wt % PDMS |
|---|---|---|---|
| 1 | 25 | 45 | 7.1 |
| 2 | 40 | 20 | 9.2 |
| 3 | 60 | 20 | 22.1 |

In addition, sample No. 1 was extracted with chloroform to recover the polydimethylsiloxane contained therein. The recovered polymer was analyzed by gel permeation chromatography (GPC) using polystyrene as a standard. Two prominent molecular weight peaks were observed, one at 3,500 MW and the other at 315,000 MW, with the area of the second peak being the largest. The GPC curve also displayed a definite molecular weight distribution of the polydimethylsiloxane between the two prominent peaks.

EXAMPLE 2

The ability of sulfonated polyethylene hollow fibers to catalyze the in situ polymerization of octamethylcyclotetrasiloxane was evaluated. Polyethylene hollow fibers were produced from low density polyethylene chips. A fiber was spun having an outside diameter of 640 μm with a wall thickness of 95 μm. The fiber was cut into 50 cm lengths and sulfonated by the process described in Example 1. The SPE hollow fibers were then cut into 5 cm lengths and immersed in excess $D_4$ which provided for diffusion of the $D_4$ from both the lumen and the outer surface of the hollow fibers simultaneously. The length of time of immersion as well as the temperature of the $D_4$ during the immersion is reported in Table 2. For some samples described in Table 2, the $D_4$ was mixed with trichloroethylene as a solvent. The solvent ratio of trichloroethylene to $D_4$ is given in the column labelled "Solvent/$D_4$."

After the period of time reported in Table 2, the SPE hollow fibers were removed from the $D_4$ or $D_4$ and solvent and washed with chloroform to remove surface $D_4$ and surface associated polydimethylsiloxane. The fibers were then dried in a vacuum oven at 45° C. for at least 48 hours or until they maintained a constant weight.

The concentration of the polydimethylsiloxane in the SPE hollow fiber was determined by weighing the fiber before and after treatment. The results are reported in Table 2.

TABLE 2

In Situ Polymerization of $D_4$ in Hollow SPE Fibers

| Sample No. | Temp. °C. | Time(days) | Solvent/$D_4$ | Wt % PDMS |
|---|---|---|---|---|
| 1 | 25 | 60 | — | 6.3 |
| 2 | 25 | 90 | — | 8.2 |
| 3 | 40 | 35 | — | 8.2 |
| 4 | 40 | 60 | — | 7.2 |
| 5 | 60 | 40 | — | 1.5 |
| 6 | 60 | 40 | 0.43 | 4.8 |

TABLE 2-continued

In Situ Polymerization of $D_4$ in Hollow SPE Fibers

| Sample No. | Temp. °C. | Time(days) | Solvent/$D_4$ | Wt % PDMS |
|---|---|---|---|---|
| 7 | 100 | 5 | — | 36.0 |
| 8 | 100 | 5 | 0.08 | 42.0 |
| 9 | 100 | 5 | 0.43 | 89.0 |
| 10 | 100 | 5 | 0.75 | 88.0 |

EXAMPLE 3

Blends of polydimethylsiloxane and sulfonated polyethylene were prepared and the molecular weight of the polydimethylsiloxane present in the sulfonated polyethylene matrix determined. The blends were prepared by contacting $D_4$ with SPE hollow fibers prepared as described in Example 2. The SPE hollow fibers were contacted with the $D_4$ for the times and temperatures given in Table 3. The polydimethylsiloxane was extracted from the matrix of the SPE hollow fiber using chloroform. Molecular weights and molecular weight distributions for the extracted polydimethylsiloxane were determined by GPC using polystyrene as a standard. Typically, two to three peaks were observed eluting from the GPC column. The results are reported in Table 3.

TABLE 3

Molecular Weight of Polydimethylsiloxane Component Extracted From SPE Matrix

| Sample No. | Temp. °C. | Time (days) | MWpeak1 | MWpeak2 | MWpeak3 |
|---|---|---|---|---|---|
| 1 | 60 | 20 | 5,000 | 25,000 | 1,410,000 |
| 2 | 80 | 20 | 5,000 | — | 2,000,000 |

EXAMPLE 4

Mechanical properties of the SPE hollow fibers described in Example 2 were conducted using an Instron Tensile Tester. The cross-sectional area of the hollow fiber was determined using a microscope with a calibration scale and is reported in Table 4 as outside diameter/wall thickness (OD/Wth). Each fiber was mounted in the Instron crosshead adjusted so that the grips were 2.5 cm apart.

The measurements reported in Table 4 were run at 25° C. using a constant strain weight of 0.877%/s. A minimum of four fibers were measured for each weight percent of polydimethylsiloxane reported. The results are reported in Table 4 as the mean value for each of the measured parameters.

TABLE 4

Stress-Strain Properties of PDMS/SPE Blend Hollow Fibers

| PDMS (Wt %) | Tensile Modulus (MPa) | Tensile Strength (MPa) | Elongation at Break (%) | OD/Wth (μm/μm) |
|---|---|---|---|---|
| 0.0 | 257 | 34 | 20 | 640/95 |
| 1.5 | 402 | 55 | 65 | 640/95 |
| 4.8 | 386 | 42 | 50 | 640/95 |
| 36.0 | 204 | 32 | 125 | 650/98 |
| 74.0 | 69 | 18 | 52 | 950/18 |

EXAMPLE 5

$D_4$ was in situ polymerized in SPE hollow fibers by placing the $D_4$ in the lumen of the fiber and subjecting the outside of the fibers to a flow of moist nitrogen gas. SPE hollow fibers were prepared as described in Example 2. The fibers had 2.2 meq/g of sulfonic acid substitution. The lumen of the hollow fibers were filled with $D_4$ and the outer surface of the hollow fibers exposed to a stream of nitrogen at 80° C. The nitrogen was bubbled through water prior to contacting the SPE hollow fiber surface. After ten days the SPE hollow fibers were washed with chloroform and dried in a vacuum oven for 5 days at 50° C. The SPE hollow fibers contained 14.6 weight percent of polydimethylsiloxane. The polydimethylsiloxane was extracted in chloroform and the molecular weight distribution determined by GPC using polystyrene as a standard. Two prominent peaks were observed, one peak at 5,000 MW and the other at 1,100,000 MW.

We claim:

1. A method for preparing a blend comprising a polydiorganosiloxane and a sulfonated polyolefin, the method comprising:

(A) swelling a solid, sulfonated polyolefin with a liquid comprising a diorganosiloxane oligomer and (B) maintaining the solid, sulfonated polyolefin at a temperature sufficient for sulfonic acid substituents of the solid, sulfonated polyolefin to catalyze the polymerization of the diorganosiloxane oligomers within the solid, sulfonated polyolefin;

where the diorganosiloxane oligomer contains from three to about 40 units of the formula $R_2SiO$, each R is independently selected from a group consisting of alkyl radicals comprising one to about 12 carbon atoms, alkenyl radicals comprising two to about 12 carbon atoms, aryls, and fluorine substituted alkyl radicals comprising one to about 12 carbon atoms.

2. A method according to claim 1, where the solid, sulfonated polyolefin is formed by chlorosulfonation of a polyolefin obtained by polymerization of an olefin or a mixture of olefins selected from the group consisting of ethylene, propylene, butene-1,4-methylpentene-1, isobutylene, and styrene; the diorganosiloxane oligomer is selected from cyclic diorganosiloxane oligomers comprising three to eight silicon atoms and hydroxy endblocked linear diorganosiloxane oligomers comprising three to 40 silicon atoms; and the diorganosiloxane oligomers are polymerized within the sulfonated polyolefin to a weight average molecular weight within a range of about $1\times10^4$ to about $2\times10^6$.

3. A method according to claim 2, where the solid, sulfonated polyolefin comprises about 0.1 to about 5 meq/g of sulfonic acid substituents and about 0.1 to 100 parts of diorganosiloxane oligomer is present per 100 parts of the swollen, solid, sulfonated polyolefin.

4. A method according to claim 3, where the diorganosiloxane oligomer is octamethylcyclotetrasiloxane and the solid, sulfonated polyolefin is sulfonated polyethylene.

5. A method according to claim 3, where the liquid further comprises a solvent effective to increase the rate of swelling of the solid, sulfonated polyolefin and thereafter maintaining the swollen, solid, sulfonated polyolefin at a temperature within a range of about 20° C. up to, but not including the melting temperature of the solid, sulfonated polyolefin for a period of time sufficient for polymerization of the diorganosiloxane oligomers to occur.

6. A method according to claim 5, where the solvent is selected from a group consisting of hydrocarbons and chlorine substituted hydrocarbon having a boiling point within a range of about 20° C. to 100° C.

7. A method according to claim 6, where the diorganosiloxane oligomer is octamethylcyclotetrasiloxane, the solid, sulfonated olefin is sulfonated polyethylene, and the solvent is trichloroethylene.

8. A blend of a solid polyolefin sulfonated with sulfonic acid substituents and a polydiorganosiloxane prepared by the method of claim 1.

9. A blend of a solid polyolefin sulfonated with sulfonic acid substituents and a polydiorganosiloxane prepared by the method of claim 3.

10. A blend of a solid polyolefin sulfonated with sulfonic acid substituents and a polydiorganosiloxane prepared by the method of claim 4.

11. A blend of a solid polyolefin sulfonated with sulfonic acid substituents and a polydiorganosiloxane prepared by the method of claim 6.

12. A blend of a solid polyolefin sulfonated with sulfonic acid substituents and a polydiorganosiloxane prepared by the method of claim 7.

13. A composition comprising:

(A) 100 parts by weight of a solid polyolefin sulfonated with sulfonic acid substituents where the solid polyolefin is formed by polymerization of an olefin or a mixture of olefins selected from a group consisting of ethylene, propylene, butene-1,4-methylpentene-1, isobutylene, and styrene; and (B) 0.1 to 100 parts by weight of hydroxy endblocked polydiorganosiloxane containing units described by formula $R_2SiO$, where each R is independently selected from a group consisting of alkyl radicals comprising one to 12 carbon atoms, alkenyl radicals comprising two to 12 carbon atoms, aryl radicals, and fluorine substituted alkyl radicals comprising one to 12 carbon atoms;

where the hydroxy endblocked polydiorganosiloxane is dispersed within the solid polyolefin.

14. A composition according to claim 13, where the solid polyolefin contains from about 0.1 to about 5 meq/g of sulfonic acid substituents and the hydroxy endblocked polydiorganosiloxane has a weight average molecular weight within a range of about $1\times10^4$ to about $2\times10^6$.

15. A method according to claim 1, where the solid, sulfonated polyolefin is a fiber having a lumen therein, the fiber is swollen by contacting the surface of the lumen with the diorganosiloxane oligomer and the exterior surface of the fiber is contacted with a moist inert gas.

16. A method according to claim 1, further comprising the presence of moisture during the polymerization of the diorganosiloxane oligomers.

* * * * *